US009950490B2

(12) United States Patent
Cattacin et al.

(10) Patent No.: US 9,950,490 B2
(45) Date of Patent: Apr. 24, 2018

(54) TEARABLE CORE, A ROLL INCLUDING SUCH A CORE AND A TEARABLE CORE MANUFACTURING METHOD

(71) Applicant: SCA TISSUE FRANCE, Saint-Ouen (FR)

(72) Inventors: Gilles Cattacin, Colmar (FR); Damien Brendle, Obersaasheim (FR)

(73) Assignee: SCA TISSUE FRANCE, Saint-Ouen (FR)

( * ) Notice: Subject to any disclaimer, the term of this patent is extended or adjusted under 35 U.S.C. 154(b) by 0 days.

(21) Appl. No.: 15/536,754

(22) PCT Filed: Dec. 19, 2014

(86) PCT No.: PCT/IB2014/003180

§ 371 (c)(1),
(2) Date: Jun. 16, 2017

(87) PCT Pub. No.: WO2016/097798

PCT Pub. Date: Jun. 23, 2016

(65) Prior Publication Data

US 2017/0361563 A1 Dec. 21, 2017

(51) Int. Cl.

| | |
|---|---|
| ***B32B 3/14*** | (2006.01) |
| ***B31C 3/00*** | (2006.01) |
| ***B65H 75/10*** | (2006.01) |
| ***B31C 11/00*** | (2006.01) |
| ***B65H 18/28*** | (2006.01) |

(52) U.S. Cl.

CPC ................ *B31C 3/00* (2013.01); *B31C 11/00* (2013.01); *B65H 18/28* (2013.01); *B65H 75/10* (2013.01); *B65H 2701/5112* (2013.01); *B65H 2701/532* (2013.01)

(58) Field of Classification Search

CPC ............... Y10T 428/18; Y10T 428/183; Y10T 428/187; Y10T 428/24992; Y10T 428/24124; D04H 1/74; E04B 2001/7683

See application file for complete search history.

(56) References Cited

FOREIGN PATENT DOCUMENTS

| | | | |
|---|---|---|---|
| JP | H1129263 | A | 2/1999 |
| WO | WO-2011/092590 | A1 | 8/2011 |

*Primary Examiner* — Alexander Thomas

(74) *Attorney, Agent, or Firm* — Drinker Biddle & Reath LLP

(57) ABSTRACT

A tearable core, adapted for winding a sheet product, includes a cylindrical body wall defining a longitudinal hole of longitudinal axis XX'. The cylindrical body wall is tearable from an edge, and includes an outer strip and an inner strip that are helically wound on one another and displacedly overlapped in a lateral direction parallel to the longitudinal axis XX', and secured together through their mutually facing surfaces by a first region of attachment. The strips are made of the material having characteristics such that the inner strip and the outer strip are made of cardboard having different water drops. The cylindrical body wall is formed by securing together the outer strip, a first end part of the outer strip of one turn being superposed and secured to a second end part of the outer strip of an adjacent turn through their mutually facing surfaces by a second region of attachment.

17 Claims, 5 Drawing Sheets

TEARABLE CORE, A ROLL INCLUDING SUCH A CORE AND A TEARABLE CORE MANUFACTURING METHOD

CROSS-REFERENCE TO PRIOR APPLICATION

This application is a § 371 National Stage Application of PCT International Application No. PCT/IB2014/003180 filed Dec. 19, 2014, which is incorporated herein in its entirety.

TECHNICAL FIELD

An aspect of the disclosure relates to a tearable core, namely a cylindrical tube, more precisely a cardboard cylindrical tube. Such a core finds a particular, though non exclusive, application in the tissue paper industry where a web of absorbent material like a web of tissue paper or a web of non-woven is wound onto such a core. Another aspect of the disclosure relates to a roll including a sheet product wound onto the above core. Still another aspect of the disclosure relates to a core manufacturing method.

BACKGROUND

Rolls of product in sheet form wound around a core are known in the art. Such rolls are used, as example as, paper towel, wiper or toilet tissue rolls for both domestic and professional applications. According to a first type of use, the sheet form product can be dispensed tangentially from the outside of the roll towards the core of the roll by, for example, rotating the roll. According to a second type of use, the sheet form product can be dispensed radially/centrally from the inside towards the outside of the roll. This is a so-called center feed dispensing. In this second case, the core must be removed from the roll before dispensing can start.

The document JPH1129263 describes an inner layer-release paper tube. The inner layer-release paper tube facilitates the disassembly and removal of the paper tube based on a simple pulling of an inner circumferential surface paper strip, and the smooth release of a winding material from the inner side. The inner layer-release paper tube consists of a spiral paper tube in which an outer circumferential surface paper strip from which the outer circumferential surface of the paper tube is formed and an inner circumferential surface paper strip from which the inner circumferential surface of the paper tube is fanned. These strips are overlapped in the lateral direction and wound in a helical manner in such a way that seams of the paper strips do not overlap. The outer circumferential surface paper strip and inner circumferential surface paper strip are intermittently bonded along the seam of the outer circumferential surface paper strip.

The document WO2011/092590 describes a core having a cylindrical wall which can be torn axially. The core is made up of two superposed strips, these respectively being an outer strip in contact with the product and an inner strip. These strips are wound on one another and joined together by regions of attachment for example by bonding. At least one of the longitudinal edges of the inner strip is not attached or is weakly attached over a determined width in order, over at least part of its helical length, to form a free and accessible tab facing the outer strip.

Both above mentioned tearable cores require a precise and careful positioning of the bonding between the inner strip and the outer strip. Therefore, the core manufacturing process is finely adjusted and controlled all over production. This is particularly true when a production cadence change occurs. Thus, there is a need to ease the manufacturing process of the tearable core, in particular by providing a tearable core that can be easily produced irrespective of the production cadence change.

SUMMARY

It is desirable to form a tearable core that overcomes the above mentioned drawback, and in particular that facilitates transition of production cadence during the manufacturing process.

According to one aspect, there is provided a tearable core, adapted for winding a sheet product, including a cylindrical body wall defining a longitudinal hole of longitudinal axis XX', the cylindrical body wall being tearable from an edge, the cylindrical body wall including an outer strip and an inner strip, the outer strip being a part of the tearable cylindrical body wall adapted to be in contact with the wound sheet product, the inner strip being another part of the tearable cylindrical body wall facing the longitudinal hole, the outer strip and the inner strip being helically wound on one another and displacedly overlapped in a lateral direction parallel to the longitudinal axis XX', the outer strip and the inner strip being secured together through their mutually facing surfaces by a first region of attachment.

In this aspect, the strips are made of materials having characteristics such that, either the inner strip is made of cardboard having a basis weight superior to the basis weight of the outer strip, and a water drop less than to the water drop of the outer strip, or the outer strip is made of cardboard having a basis weight superior to the basis weight of the inner strip, and a water drop less than the water drop of the inner strip.

Also, in this aspect, the cylindrical body wall is built-up as a core tube by securing together the outer strip, a first end part of the outer strip of one turn being superposed and secured to a second end part of the outer strip of an adjacent turn through their mutually facing surfaces by a second region of attachment.

The first and second region of attachment may be positioned such that two vis-àvis surfaces of the outer strip and the inner strip are not attached together over a defined width at an overlapping helical area where two adjacent turns overlap so as to form a free and internally accessible tab at the edge of the tearable core.

The outer strip and the inner strip, and the end parts of the outer strip may be secured together by adhesive bonding through their mutually facing surfaces, the first and second region of attachment being made of a film of adhesive, the film of adhesive being continuous or discontinuous.

The outer strip and the inner strip, and the end parts of the outer strip may be secured together by mechanical fastening through their mutually facing surfaces.

The first region of attachment may extend from a first end part of the outer strip to a second end part of the inner strip. A width W33 of the outer strip may be identical to or smaller than a width W34 of the inner strip.

The second region of attachment may extend over a width that is smaller than a width of the first region of attachment.

The basis weight of the inner strip may be around 50% higher than the basis weight of the outer strip, and the water drop of the inner strip may be a few minutes while the water drop of the outer strip may be unsized.

The basis weight of the outer strip may be around 50% higher than the basis weight of the inner strip, and the water drop of the outer strip may be a few minutes while the water drop of the inner strip may be unsized.

The basis weight per unit area of one of the strip may be ranging from 100 to 150 g/m$^2$ and the water drop may be around 10 min, and the basis weight per unit area of the other strip may be ranging from 400 to 450 g/m$^2$ and the water drop may be unsized.

According to another aspect, there is provided a roll of sheet product including a sheet product wound onto a tearable core as described above.

The roll of sheet product may be a web of tissue paper.

According to a further aspect, there is provided a method of manufacturing a tearable core under the form of a cylindrical body wall defining a longitudinal hole of longitudinal axis XX', the cylindrical body wall being tearable from an edge, the manufacturing method including:

- making an outer strip and an inner strip in materials having characteristics such that, either the inner strip is made of cardboard having a basis weight superior to the basis weight of the outer strip, and a water drop less than the water drop of the outer strip, or the outer strip is made of cardboard having a basis weight superior to the basis weight of the inner strip, and a water drop less than the water drop of the inner strip;
- assembling the outer strip and the inner strip by displacedly overlapping the outer strip and the inner strip in a lateral direction parallel to the longitudinal axis XX', the outer strip and the inner strip being secured together through their mutually facing surfaces by a first region of attachment;
- helically winding the assembled outer and inner strips such that the cylindrical body wall is built-up as a core tube by securing together the outer strip, an external surface of a first end part of the outer strip of one turn being overlapped upon an external surface of a second end part of the outer strip of the adjacent turn and secured together through their mutually facing surfaces by a second region of attachment; and
- cutting the tearable core at a defined length.

The method of manufacturing a tearable core may further include applying an adhesive on the external surface of the first end part of the outer strip of the assembled outer and inner strips either as a full line or as a dotted line.

With embodiments of the invention, it is possible to avoid, or at least greatly reduce, the control and adjustments required during the cores manufacturing process, in particular at production cadence change. This is achieved by the combination of the material constituting the outer and inner strips, and the position of the second region of attachment.

Embodiments of the invention further enable maintaining the capacity of the core to be easily and qualitatively torn before being installed into a dispenser, i.e. before dispensing starts.

Other advantages will become apparent from the hereinafter description of particular embodiments of the invention.

BRIEF DESCRIPTION OF THE DRAWINGS

Embodiments of the present invention are illustrated by way of examples and not limited to the accompanying drawings, in which like references indicate similar elements.

DETAILED DESCRIPTION OF PARTICULAR EMBODIMENTS

Figure 1:
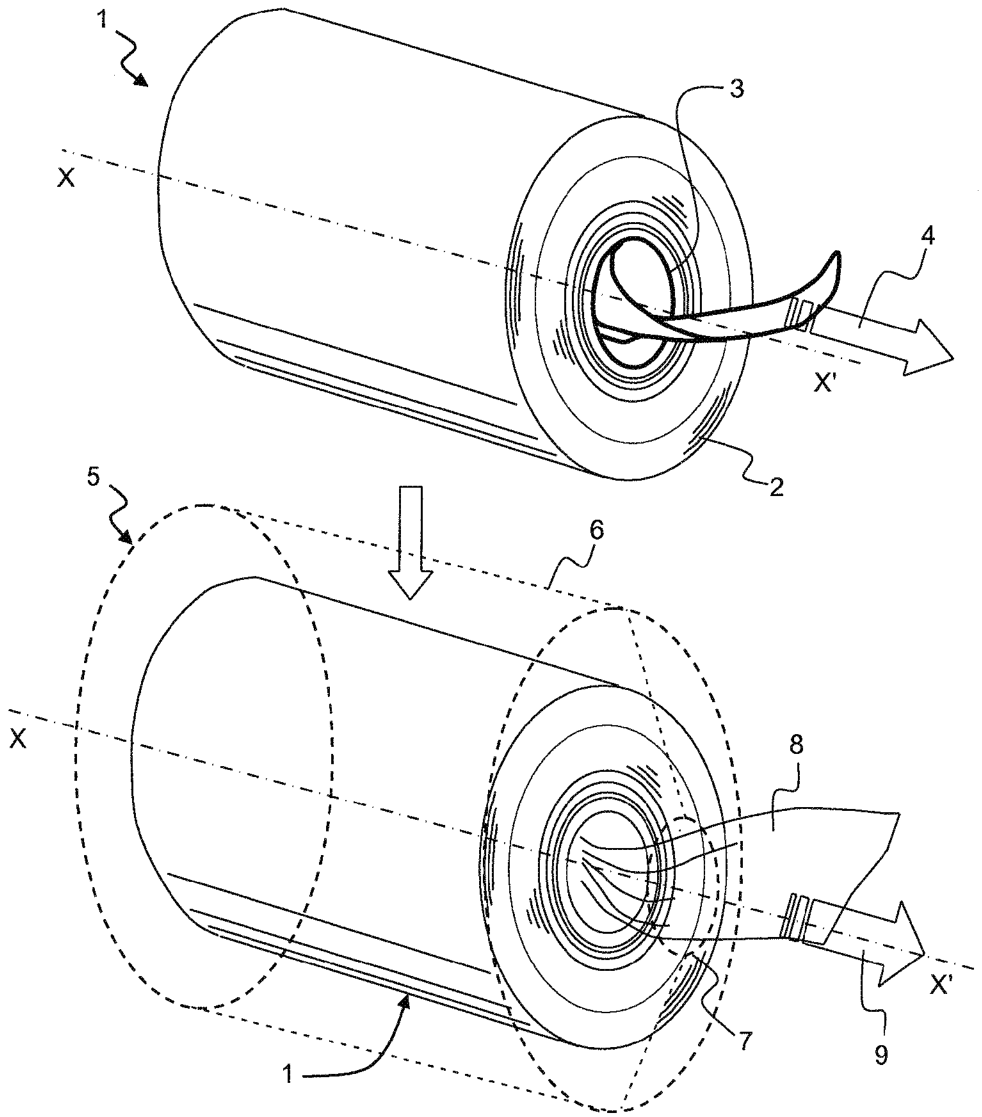
FIG. 1 top and bottom parts are perspective views schematically illustrating a paper towel roll when a tearable core is being torn, and a paper towel roll in a center feed dispenser during radial/central dispensing, respectively.

FIG. 1 top part is a perspective view schematically illustrating a tissue paper roll 1. The tissue paper roll 1 includes a wound absorbent product, for example a tissue paper sheet 2 wound onto a tearable core 3 made of cardboard material. The tissue paper sheet 2 may be provided with pre-cuttings transversal lines (not shown) for ease of detaching individual sheets of tissue paper. Before starting dispensing the portions of sheet of tissue paper from the roll 1, the core 3 is torn axially by applying a pulling tearing force 4 according to the roll longitudinal axis XX'. After the core has been torn and fully removed from the roll 3, the first internal windings of the tissue paper roll 1 can be grasped from the hole constituting the center inside of the roll. Then, the roll is fitted within a center feed dispenser 5.

FIG. 1 bottom part is a perspective view schematically illustrating a tissue paper roll 1 (depicted in plain line) in a center feed dispenser 5 (depicted in dotted line) during radial/central dispensing. In this exemplary embodiment, the center feed dispenser 5 includes a body 6 for example of substantially cylindrical shape for housing the tissue paper roll 1. The cylindrical body 6 includes a dispensing opening 7. Unwound portions of sheet of tissue paper 8 are dispensed from the roll 1 through the dispensing opening 7 when a user applies a pulling dispensing force 9 substantially according to the roll longitudinal axis XX'. The center feed dispenser 5 may further include additional elements that are not depicted for sake of drawing clarity, for example a closing mechanism, a nozzle through which the sheet is dispensed or a cutting device for easing detaching portions of sheet of tissue paper 8, etc. Although, the drawings show the longitudinal axis XX', as a horizontal axis, other directions are also appropriate, for example the center feed dispenser 5 may be positioned substantially vertically.

Figure 2:
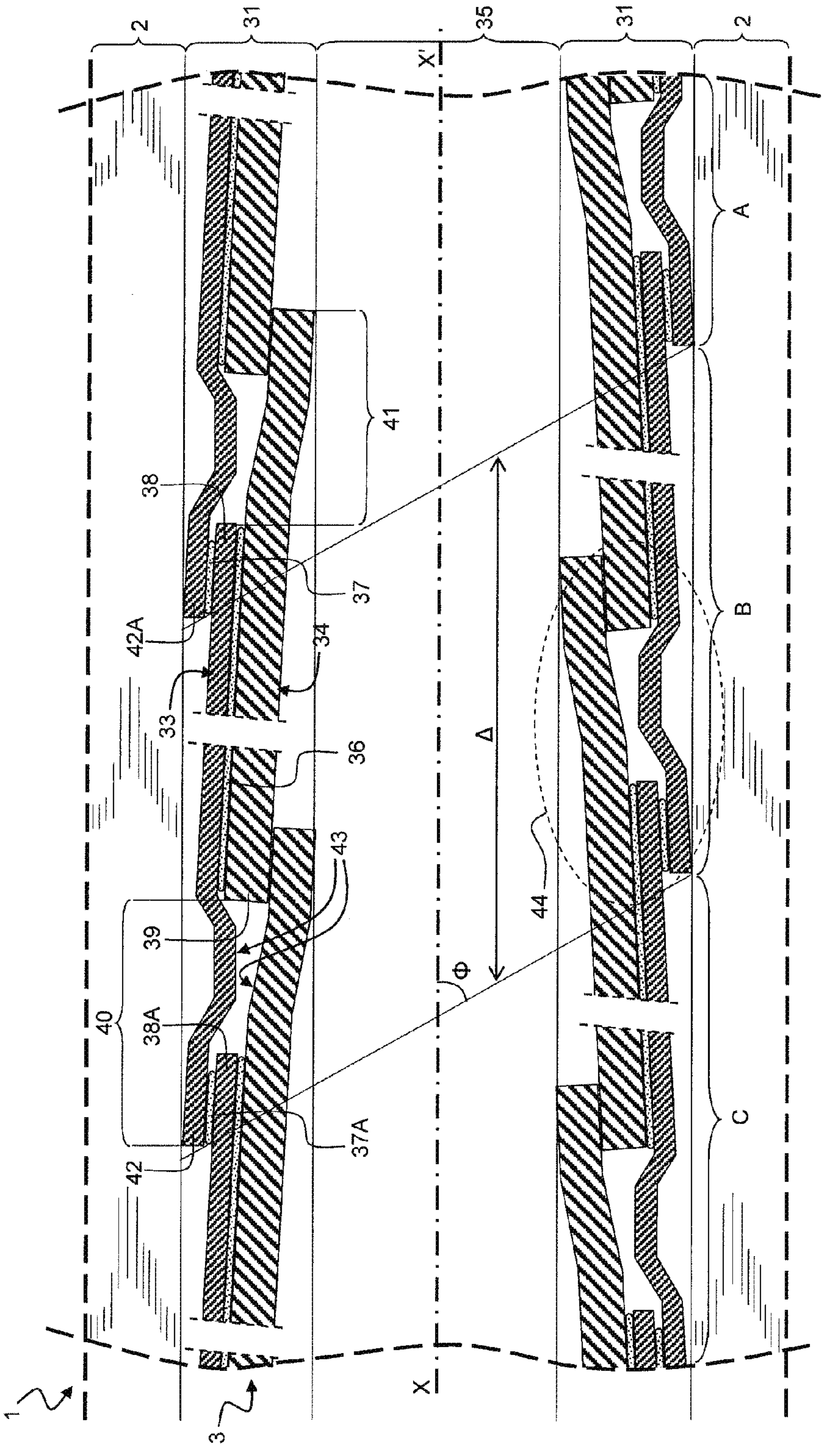
FIG. 2 is a cross-section view schematically and partially showing a roll including a tearable core and wound absorbent product according to an embodiment of the invention.
Figure 4:
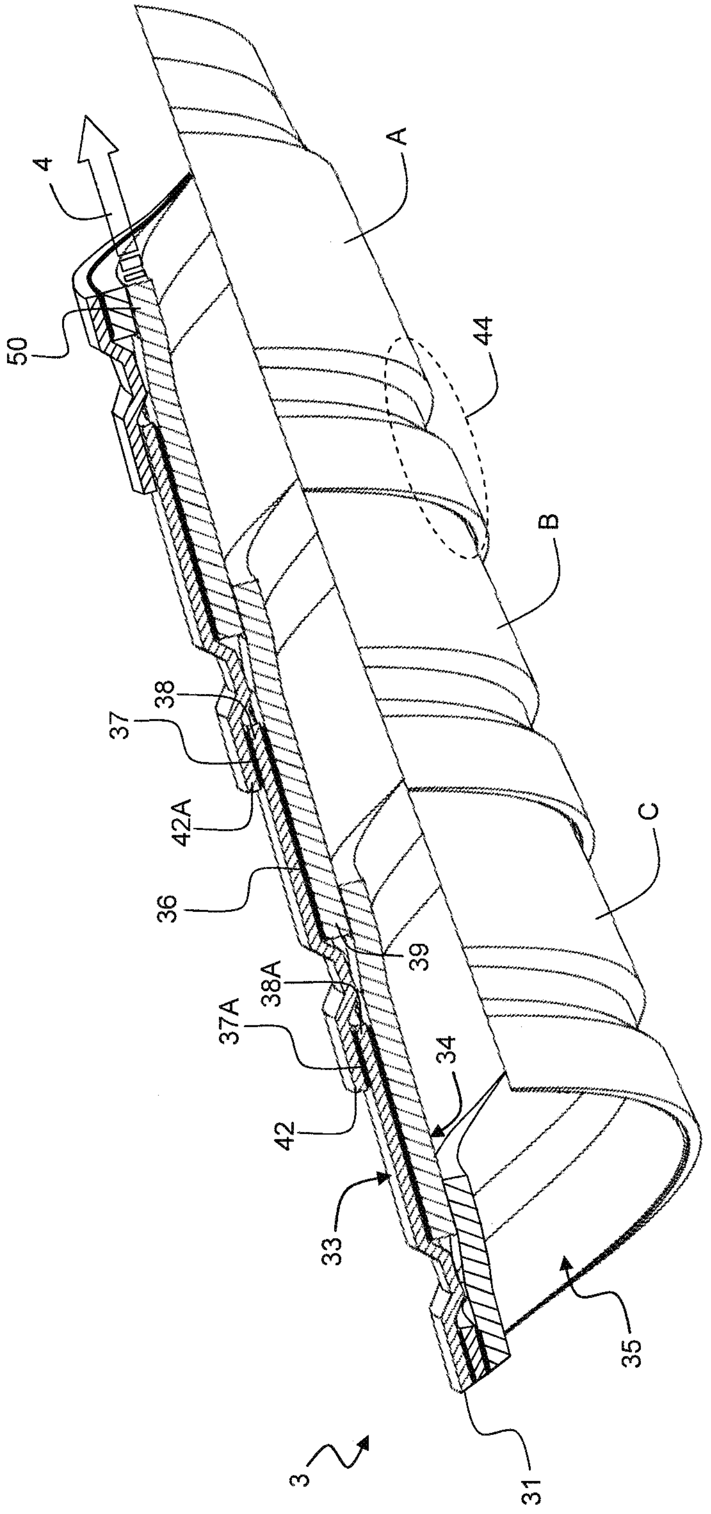
FIG. 4 is a partial cross-section and perspective view of the tearable core of FIG. 2.
Figure 3:
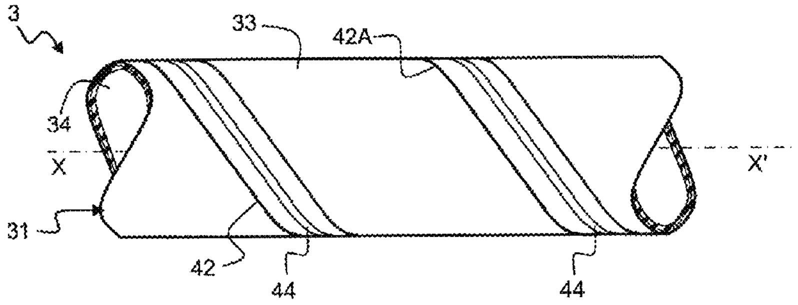
FIG. 3 is a side view of the tearable core of FIG. 2 illustrating the overlapping helical area.

FIGS. 2 to 4 schematically illustrate a tearable core 3 according to a particular embodiment. The tearable core 3 includes a tearable cylindrical body wall 31 defining a longitudinal hole 35 of longitudinal axis XX'.

FIG. 2 is a cross-section view schematically and partially showing a tissue paper roll 1 including the tearable core 3 and the wound absorbent product 2. The tearable cylindrical body wall 31 of the tearable core 3 includes an outer strip 33 and an inner strip 34. The outer strip 33 is the part of the tearable cylindrical body wall 31 in contact with the wound absorbent product 2. The inner strip 34 is the part of the tearable cylindrical body wall 1 facing the longitudinal hole 35 through the tissue paper roll 1. The outer strip 33 and the inner strip 34 are displacedly overlapped in a lateral direction parallel to the longitudinal axis XX'. The outer strip 33 and the inner strip 34 are helically wound on one another at appropriate winding angle Φ and pitch Δ. The outer strip 33 and the inner strip 34 are secured together by specific regions of attachments 36, 37 through their mutually facing surfaces such as to form a tube of superposed strips. In the presently described embodiment, the outer strip 33 and the inner strip 34 are secured together by adhesive bonding through their mutually facing surfaces. Adhesive bonding is performed by applying a film of adhesive on the mutually facing surface that needs to be bonded together. The film of adhesive is applied in a continuous manner. However, as an alternative, it may be applied in a discontinuous or intermittent manner.

According to a first and third embodiment, the characteristics of the material constituting the strips are such that the inner strip 34 is made of a cardboard having a basis weight superior to the basis weight of the outer strip 33, and a water drop less than the water drop of the outer strip 33. As an example, the outer strip 33 is made of a cardboard having a low basis weight and a high water drop, while the inner strip 34 is made of cardboard having a medium basis weight and a low water drop. According to the first embodiment, the basis weight of the inner strip 34 is around 50% higher than the basis weight of the outer strip 33, and the water drop of the inner strip 34 is a few minutes while the water drop of the outer strip 33 is unsized. The water drop evaluates the water absorption by cardboard material. It is measured by dropping a drop of water on the surface of cardboard and measuring the time in seconds/minutes for the drop to be completely absorbed. An unsized water drop means that after a determined period of time the drop is still not absorbed by the cardboard material.

More precisely, the method for measuring water drop uses as an equipment, a free standing burette and a stopwatch. Before starting testing, it is necessary to check that the drop height be 7 centimeters more or less 3 millimeters. A sample of cardboard material is prepared. Three drops of water are deposited at a distance of 3 cm to each other onto one side of the cardboard material sample and the stopwatch is immediately started when a drop is deposited. The time is recorded when each drop has been completely absorbed by the cardboard material sample. The same testing operation is repeated for the other side of the sample. For each side, the average of the measures is calculated in minutes.

Examples are given in the tables hereinafter, wherein cardboard material is manufactured and commercialized by the company Sonoco.

TABLE 1

(first embodiment):

| | outer strip 33 | inner strip 34 |
|---|---|---|
| basis weight/weight per unit area (g/m$^2$) | 400-450 | 150-200 |
| water drop (min) | Unsized | 10 |

Alternatively, according to a second and fourth embodiment, the hereinbefore characteristic of the material constituting the strip may be inversed, meaning that the outer strip 33 is made of a cardboard having a basis weight superior to the basis weight of the inner strip 34, and a water drop less than the water drop of the inner strip 34.

TABLE 2

(second embodiment):

| | outer strip 33 | inner strip 34 |
|---|---|---|
| basis weight/weight per unit area (g/m$^2$) | 150-200 | 400-450 |
| water drop (min) | 10 | Unsized |

TABLE 3

(third embodiment):

| | outer strip 33 | inner strip 34 |
|---|---|---|
| basis weight/weight per unit area (g/m$^2$) | 230 | 180 |
| water drop (min) | unsized | 10 |

TABLE 4

(fourth embodiment):

| | outer strip 33 | inner strip 34 |
|---|---|---|
| basis weight/weight per unit area (g/m$^2$) | 180 | 230 |
| water drop (min) | unsized | 10 |

A tearable core according to the first and third embodiment is easier to extract than a tearable core according to the second embodiment.

According to a fifth embodiment, the characteristics of the material constituting the strips are such that the inner strip 34 is made of a cardboard having a basis weight substantially similar to the basis weight of the outer strip 33, and a water drop less than the water drop of the outer strip 33. As an example, the outer strip 33 is made of a cardboard having a medium basis weight and a high water drop, while the inner strip 34 is made of cardboard having a medium basis weight and a low water drop. According to this specific embodiment, the water drop of the inner strip 34 is a few minutes while the water drop of the outer strip 33 is unsized.

TABLE 5

(fifth embodiment):

| | outer strip 33 | inner strip 34 |
|---|---|---|
| basis weight/weight per unit area (g/m$^2$) | 180-230 | 180-230 |
| water drop (min) | unsized | 10 |

Further, the positions of the specific regions of attachments 36, 37 are chosen such as to form a robust core 3 for supporting the wound absorbent product 2, and at the same time to provide a free and internally accessible tab 50 for easing axial tearing of the tearable core 3.

Figure 6:
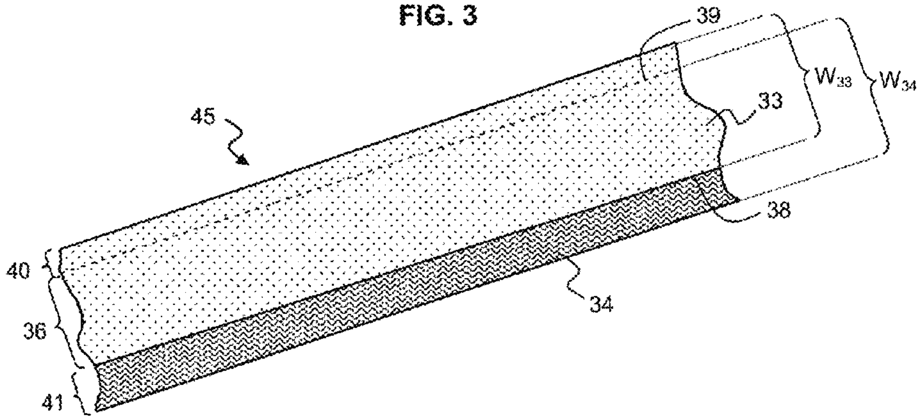
FIG. 6 is a top view of a strip including assembled outer and inner cardboard strips used to manufacture the tearable core of FIG. 2.

FIG. 6 is a top view of a strip b 45 including assembled outer and inner strips 33, 34 used to manufacture the tearable core of FIG. 2. Both outer and inner strips are flat. The outer strip b 33 is displacedly overlapped and bonded to the inner strip 34 by the first region of attachment 36 that extends from a first end part 38 of the outer strip 33 to a second end part 39 of the inner strip 34 through their mutually facing surfaces. As a consequence, a longitudinal surface 40 at the side edge of the outer strip 33, and a longitudinal surface 41 at another side edge of the inner strip b 34 are not attached together. At this stage, the surfaces of these longitudinal surfaces 40, 41 are non-adhesive coated surfaces. The width $W_{33}$ of the outer strip b 33 may be identical to the width $W_{34}$ of the inner strip 34. Alternatively, the width $W_{33}$ of the outer strip b 33 may be smaller than the width $W_{34}$ of the inner strip b 34.

FIG. 2 depicts in cross-section three consecutive turns A (shown partially), B and C (shown partially) obtained by helically winding the strip b 45 of FIG. 6. FIG. 4 is a partial cross-section and perspective view showing the same. At one side, the outer strip 33 of one turn, for example turn B, is superposed and attached to the outer strip of the adjacent turn, for example turn A, by a second region of attachment 37 between the first end part 38 of the outer strip 33 of turn B and the second end part 42A of the outer strip 33 of adjacent turn A. At the other side, the outer strip 33 of the turn B, is superposed and attached to the outer strip of the adjacent turn, for example turn C, by another second region of attachment 37A between the first end part 38A of the outer strip b 33 of turn C and the second end part 42 of the outer strip 33 of turn B. The second region of attachment 37, 37A extends over a width that is smaller than a width of the first region of attachment 36 that bonds both outer and inner strips 33, 34. As a consequence, two vis-à-vis surfaces 43 of the outer strip 33 and the inner strip b 34 are not attached together over a defined width at an overlapping helical area 44 where two adjacent turns overlap. FIG. 3 is a side view of the tearable core of FIG. 2 illustrating the overlapping helical area 44. Further, it is to be noted that the tearable cylindrical body wall 31 is maintained as a coherent tube only by the attachment 37 of the outer strip b 33. With the hereinbefore mentioned embodiments (combining the material used for the strips and the position of the region of attachments), an association (first region of attachment 36) is created between the outer strip 33 and the inner strip 34 that is stronger than the association (second region of attachment 37) between the adjacent turns of the outer strip 33. As a consequence, a frangible zone is created at the second region of attachment 37. The inner strip 34 serves as a means for applying the pulling tearing force that breaks the second region of attachment 37. A free and internally accessible tab 50 is formed at the edge (selvage) of the core that has been cut substantially perpendicularly to the longitudinal axis XX'. This tab 50 can be easily grasped in order to apply the pulling tearing force 4 shown in FIG. 1.

Figure 5A:
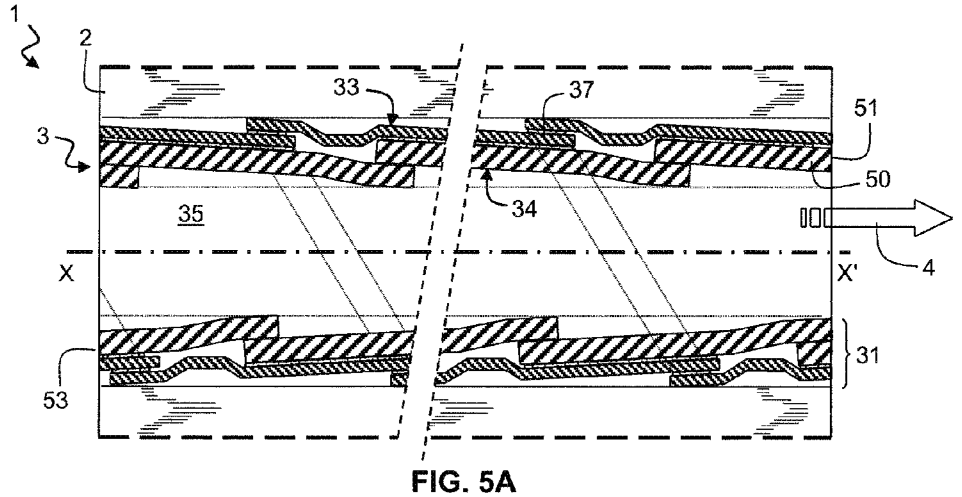
FIGS. 5A-C are cross-section views schematically and partially showing an extraction sequence of the tearable core of FIG. 2.
Figure 5B:
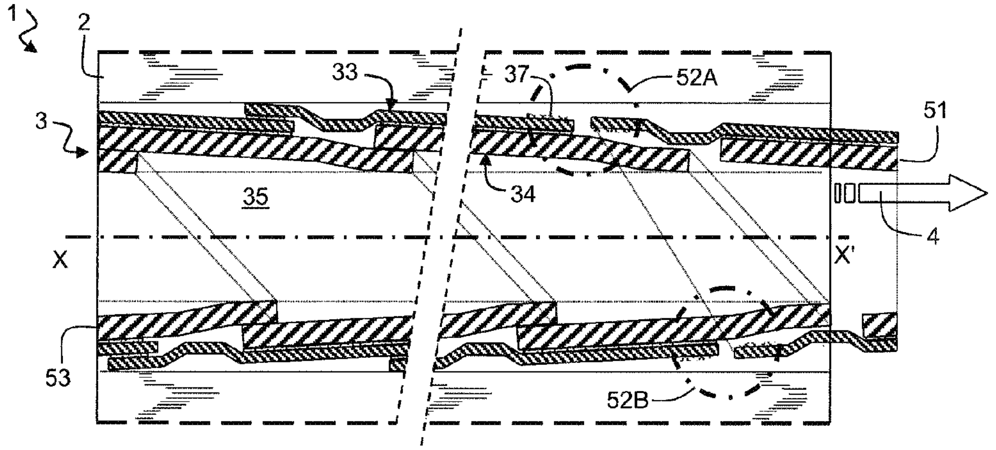
Figure 5C:
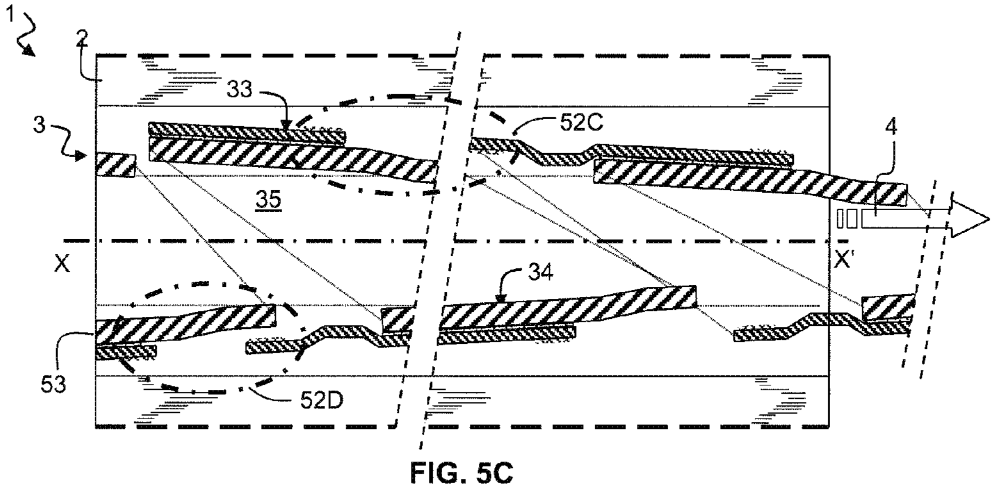

FIGS. 5A, 5B and 5C are cross-section views schematically and partially showing an extraction sequence of the tearable core of FIG. 2. A user grasps the free and internally accessible tab 50 and applies the pulling tearing force 4 according to a direction substantially parallel the longitudinal axis XX'. The pulling force 4 has the effect to break the association zone 52A, at the second region of attachment 37, between the superposed end parts 38, 42 of the outer strip 33 close to the edge 51 of the tearable core 3. While the pulling force 4 is further applied, the breaking effect continues to propagate helically and continuously breaks the second region of attachment 37 (various broken association zone 52B, 52C and 52D are shown as steps in the extraction sequence) until the other edge of the tearable core 3 is reached. At the same time, the diameter of the torn core reduced and the cylindrical body wall 31 is not anymore in contact with the sheet product 2. As a result, the tearable core 3 is torn axially and the user gains access to the first internal sheet product 2 from the inside 35 of the roll 1.

Figure 7:
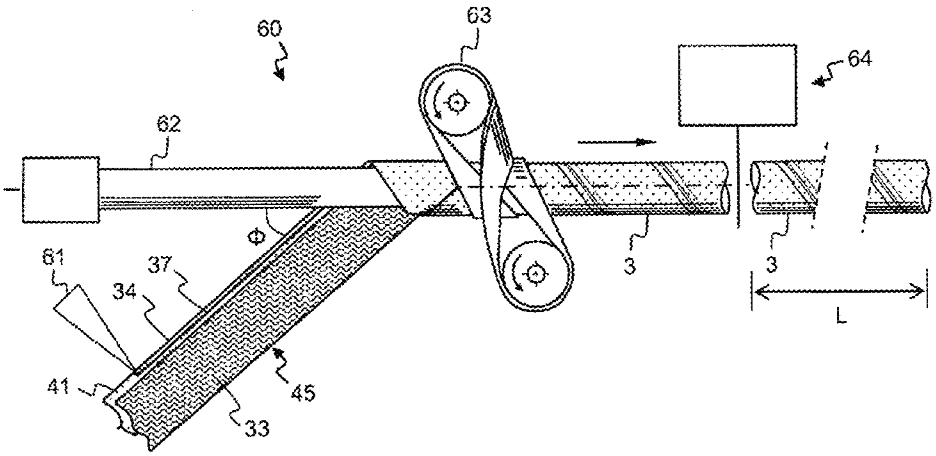
FIG. 7 schematically illustrates a manufacturing machine and method for winding and cutting tearable core of FIG. 2.

FIG. 7 is schematically showing the manufacturing of a core 3 under the form of a cylindrical tube. The spirally wound tube core 3 is formed by spirally winding a strip 45 including preassembled outer and inner strips 33, 34 of cardboard onto a circular cylindrical mandrel at a given spiral wind angle. The strip 45 is wound such that the external surface of the first end part 38 of the outer strip 33 of one turn is overlapped upon the external surface of the second end part 42 of the outer strip of the adjacent turn and adhered together in the overlapping helical area 44 to build up the cylindrical tube.

As an example, the core has a diameter of around 80 mm, a width W33 around 120 mm, a width W34 around 140 mm, a width of the vis-à-vis portion 43 around 10 mm, and a width of the overlapping helical area 44 around 40 mm.

More precisely, FIG. 7 schematically illustrates a machine for winding and cutting tearable core tube 3. The tearable core 3 is spirally wound in the winding unit 60 and then cut to the desired length in the cutting unit 64.

The winding unit 60 includes a gluing depositing nozzle 61, a mandrel 62 and a winding belt 63.

The gluing depositing nozzle 61 is positioned upstream of the mandrel 62 and the winding belt 63. The gluing depositing nozzle 61 is applying an adhesive (glue) on the external surface (longitudinal surface 41) of the first end part 38 of the outer strip 33 of the strip 45 of preassembled outer and inner strips 33, 34 as a full line (as shown) or as a dotted line (not shown). The line may have a width of a few millimeters.

The tearable core tube is formed by spirally winding the strip 45 onto the mandrel 62. The mandrel 62 may be an elongate metallic cylinder. The winding angle Φ may be 45°, but any other angle may be acceptable.

The winding belt 63 engages the strip 45 and forms a tearable core tube 3. As a result of this engagement, the core tube advances along the mandrel in a screw fashion. The external surface of the first end part 38 of the outer strip 33 is applied so as to adhere onto the external surface (longitudinal surface 40) of the second end part 42 of the outer strip of the adjacent turn (see FIG. 2 for details). This results in forming a well defined tearable core tube 3 downstream of the winding belt 63.

The cutting unit 64 is positioned downstream of the winding unit 60. The cutting unit 64 cuts tearable core tube 3 of the desired length L. The cutting unit 64 may include a circular saw, a blade, a crushing device, etc. FIG. 3 schematically and partially illustrates the tearable core tube 3 that is obtained with the machine depicted in FIG. 7.

The overall process may be continuous or discontinuous, meaning that the strip 45 may be manufactured (preassembled) separately and then temporarily stored as a roll (this is not shown) before being wound as tube cores in the described machine.

With embodiments of the invention, the manufacturing is simplified resulting in the possibility to increase the production cadency from 30-35 m/min up to 80 m/min.

The drawings and their descriptions hereinbefore illustrate rather than limit the invention.

The sizes, densities, angles and positions of the respective strips in the depicted embodiments are non limitative examples. The skilled person will readily recognize that these sizes, densities, angles and positions may be changed if desired or deemed necessary with respect to the required tearable effect to be achieved, or to adjust the section of the core to other dimension, etc. Further, the examples given in the tables are non limitative examples based on currently commercialized cardboard material; one can imagine that, in the future, cardboard material having a basis weight decreasing up to 80 g/$m^2$ may be possible.

Though the depicted and described embodiments show the outer strip and the inner strip, and the end parts of the outer strip to be secured together by adhesive bonding through their mutually facing surfaces, these strips or parts of strip may alternatively be secured together by mechanical fastening through their mutually facing surfaces, for example by knurling. In this case, the deformation of the mutually facing surfaces of the strips or parts of strip resulting from a knurling process constitutes the first and second region of attachment.

The core may be used in a winding sheet product as "rolls of sheet product". This has a large meaning encompassing, as examples, the rolls of paper towels, toilet tissues, plastic sheets or the like, metal sheets (e.g. aluminum) sheets or the like, food preservation bags, wraps, etc. The sheet product may be rolled as a continuous non-perforated sheet or pre-perforated sheets. The "roll of sheet product" may be used for residential or commercial applications. A dispenser assembly may dispense the sheets of product from the roll of sheet product either manually (a user may pull the sheet of material with a hand) or motor assisted (a motor may assist in automatically dispensing the sheet of material on wish). Such dispenser assembly and mechanisms are not germane to the present invention and will not be further described in details.

Any reference sign in a claim should not be construed as limiting the claim. The word "comprising" does not exclude the presence of other elements than those listed in a claim. The word "a" or "an" or "at least one" preceding an element does not exclude the presence of a plurality of such element.

The invention claimed is:

1. A tearable core, adapted for winding a sheet product, comprising a cylindrical body wall defining a longitudinal hole of longitudinal axis XX', the cylindrical body wall being tearable from an edge, the cylindrical body wall comprising an outer strip and an inner strip, the outer strip being a part of the tearable cylindrical body wall adapted to be in contact with the wound sheet product, the inner strip being another part of the tearable cylindrical body wall facing the longitudinal hole, the outer strip and the inner strip being helically wound on one another and displacedly overlapped in a lateral direction parallel to the longitudinal axis XX', the outer strip and the inner strip being secured together through their mutually facing surfaces by a first region of attachment, wherein the inner and outer strips are made of materials having characteristics such that, either the inner strip is made of cardboard having a water drop less than the water drop of the outer strip, or the outer strip is made of cardboard having a water drop less than the water drop of the inner strip, and wherein the cylindrical body wall is built-up as a core tube by securing together the outer strip, a first end part of the outer strip of one turn being superposed and secured to a second end part of the outer strip of an adjacent turn through their mutually facing surfaces by a second region of attachment.

2. The tearable core of claim 1, wherein the first and second regions of attachment are positioned such that two vis-à-vis surfaces of the outer strip and the inner strip are not attached together over a defined width at an overlapping helical area where two adjacent turns overlap so as to form a free and internally accessible tab at the edge of the tearable core.

3. The tearable core of claim 1, wherein the outer strip and the inner strip, and the first and second end parts of the outer strip are secured together by adhesive bonding through their mutually facing surfaces, the first and second regions of attachment being made of a film of adhesive, the film of adhesive being continuous or discontinuous.

4. The tearable core of claim 1, wherein the outer strip and the inner strip, and the first and second end parts of the outer strip are secured together by mechanical fastening through their mutually facing surfaces.

5. The tearable core of claim 1, wherein the first region of attachment extends from a first end part of the outer strip to a second end part of the inner strip, and wherein a width of the outer strip is identical to or smaller than a width of the inner strip.

6. The tearable core of claim 1, wherein the second region of attachment extends over a width that is smaller than a width of the first region of attachment.

7. The tearable core of claim 1, wherein the inner strip is made of cardboard having a basis weight superior to the basis weight of the outer strip.

8. The tearable core of claim 7, wherein the basis weight of the inner strip is around 50% higher than the basis weight of the outer strip, and the water drop of the inner strip is a few minutes while the water drop of the outer strip is unsized.

9. The tearable core of claim 1, wherein the outer strip is made of cardboard having a basis weight superior to the basis weight of the inner strip.

10. The tearable core of claim 9, wherein the basis weight of the outer strip is around 50% higher than the basis weight of the inner strip, and the water drop of the outer strip is a few minutes while the water drop of the inner strip is unsized.

11. The tearable core of claim 1, wherein the basis weight per unit area of one of the outer strip or the inner strip is ranging from 150 to 200 $g/m^2$ and the water drop is around 10 min, and the basis weight per unit area of the other of the outer strip or the inner strip is ranging from 400 to 450 $g/m^2$ and the water drop is unsized.

12. The tearable core of claim 1, wherein the inner strip is made of cardboard having a basis weight equal to the basis weight of the outer strip.

13. The tearable core of claim 12, wherein the basis weight per unit area of one of the outer strip or the inner strip is ranging from 180 to 230 $g/m^2$ and the water drop is around 10 min, and the basis weight per unit area of the other of the outer strip or the inner strip is ranging from 180 to 230 $g/m^2$ and the water drop is unsized.

14. A roll of sheet product comprising a sheet product wound onto the tearable core of claim 1.

15. The roll of sheet product of claim 14, wherein the sheet product is a web of tissue paper.

16. A method of manufacturing a tearable core under the form of a cylindrical body wall defining a longitudinal hole of longitudinal axis XX', the cylindrical body wall being tearable from an edge, comprising:

making an outer strip and an inner strip in materials having characteristics such that, either the inner strip is made of cardboard having a water drop less than the water drop of the outer strip, or the outer strip is made of cardboard having a water drop less than the water drop of the inner strip;

assembling the outer strip and the inner strip by displacedly overlapping the outer strip and the inner strip in a lateral direction parallel to the longitudinal axis XX', the outer strip and the inner strip being secured together through their mutually facing surfaces by a first region of attachment;

helically winding the assembled outer and inner strips such that the cylindrical body wall is built-up as a core tube by securing together the outer strip, an external surface of a first end part of the outer strip of one turn being overlapped upon an external surface of a second end part of the outer strip of the adjacent turn and secured together through their mutually facing surfaces by a second region of attachment; and cutting the tearable core at a defined length.

17. The method of manufacturing a tearable core of claim 16, further comprising applying an adhesive on the external surface of the first end part of the outer strip of the assembled outer and inner strips either as a full line or as a dotted line.

* * * * *